Patented Dec. 2, 1952

2,620,325

UNITED STATES PATENT OFFICE 2,620,325

POLYMERIC OXIMES AND THEIR PREPARATION

Carl M. Langkammerer, Wilmington, Del., assignor to E. I. du Pont de Nemours and Company, Wilmington, Del., a corporation of Delaware No Drawing. Application June 25, 1951, Serial No. 233,485

8 Claims. (Cl. 260—63)

This invention relates to new compositions of matter and to methods for their preparation. More particularly this invention relates to new polymeric oximes and to methods for their preparation.

It is known to prepare oximes by reaction of monomeric and polymeric oxo-carbonyl compounds with hydroxylamine. According to U. S. Patent 2,495,286 oximes are obtained from ethylene/carbon monoxide polymers by treating said polymers with hydroxylamine. In the resulting oximes the oxime groups are on carbons which formerly carried oxo-oxygen. Thus, in a 1:1 ethylene/carbon monoxide polymer the oxime may be considered as being derived from a 1,4-diketone. The preparation of an oxime from a 1,4-diketone and the structural unit of such resulting 1,4-dioxime is represented as follows:

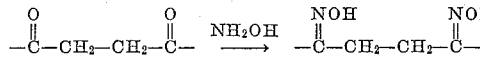

It is an object of this invention to provide new polymers and methods for their preparation. A further object is to provide new polymeric oximes and methods for their preparation. A still further object is to provide new polymeric oximes from ethylene/carbon monoxide copolymers. Other objects will appear hereinafter.

The objects of this invention are accomplished by providing a new class of polymeric oximes which structurally correspond to oximes of polymeric poly(1,2-diketones). These novel polymeric oximes include polymeric poly(alpha-ketooximes), (polymeric poly(1,2-ketooximes)), and polymeric polyoximes in which the oxime groups are on vicinal carbons, i. e., polymeric poly(1,2-dioximes). The new polymeric poly(alpha-ketooximes) of this invention have a main chain of carbon atoms with vicinal keto and oxime groups. The new polymeric poly(1,2-dioximes) have a main chain of carbon atoms with the oxime groups directly attached to adjacent carbon atoms of the chain.

These novel oximes correspond to oximes of polymeric poly(1,2-diketones) and can be prepared from ethylene/carbon monoxide copolymers by reacting the copolymer with a nitrosating agent to form the polymeric poly(1,2-ketooxime), in which the keto-oxygen and oxime groups are on vicinal carbon atoms of the chain, and then if desired, with hydroxylamine to form the polymeric poly(1,2-dioxime), in which the oxime groups are on vicinal carbon atoms of the chain. The reactions involved are represented as follows:

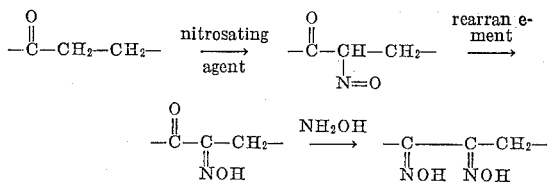

The polymeric poly(1,2-ketooximes) are characterized by having the following recurring structural unit:

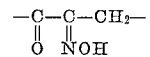

The polymeric poly(1,2-dioximes) are characterized by having the following recurring structural unit:

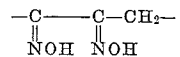

In one method for preparing the oximes of this invention a reactor fitted with a stirrer, a reflux condenser and dropping funnel, is charged with an ethylene/carbon monoxide polyketone and an organic solvent, or mixture of organic solvents, such as a mixture of benzene and alcohol, and the mixture agitated until solution is complete. To the stirred solution there is added from 0.1 to 5% hydrogen chloride based on the weight of the polyketone. The mixture is warmed to between 30° and 55° C. and isoamyl nitrite is added at such a rate as to maintain the temperature of the reaction mixture between 35° and 45° C. After all the isoamyl nitrite has been added, the source of heat is removed and stirring is continued until the exothermic nitrosating reaction is complete, as evidenced by cessation of temperature rise. The reaction mixture is filtered and then subjected to vacuum distillation to remove about one half of the reaction medium. The concentrate is washed several times with water, the organic layer separated, and subjected to vacuum distillation to remove the remaining solvent. The product is dried at ambient temperatures and is obtained as a solid which is soluble in organic solvents such as benzene and chloroform.

The ketooxime obtained as above is converted to a polyoxime by treating a solution thereof in a water-soluble organic solvent such as dioxane with aqueous hydroxylamine at 0° to 10° C. The reaction mixture is allowed to stand over-night, the lower aqueous layer is removed by decantation, and the organic layer is then vacuum distilled over a water bath. The residue is the polyoxime, characterized as being soluble in methanol, ethanol, and dioxane but insoluble in benzene and chloroform, which are solvents for the ketooxime.

In another method for preparing the oximes of this invention, the step of separating the ketooxime and then oximating it to the polyoxime is omitted. Thus, the procedure described above for preparing the ketooxime is repeated and the ketooxime thus obtained is then treated without separation, with hydroxylamine, as previously described, to form the polyoxime.

The examples which follow are submitted to illustrate and not to limit this invention.

Example I

One hundred twelve parts of an ethylene/carbon monoxide copolymer having an ethylene/carbon monoxide mole ratio of 3.6:1 and a molecular weight of about 2350 were dissolved in 320 parts of benzene and 170 parts of absolute alcohol with stirring and heating to 45° C. To this stirred solution was added 5 parts of concentrated hydrochloric acid and then 160 parts of isoamyl nitrite over a period of 1¼ hours. The reaction mixture was stirred for 4¼ hours longer and then allowed to stand for 12 to 15 hours. After filtration from a small amount of solid the reaction mixture was concentrated to one-half of its original volume and then washed with 4 portions of water using 500 parts in each portion. The organic layer was concentrated in vacuo at a temperature of 45–50° C., leaving 138.5 parts of brownish, rubbery product as a residue. This was soluble in chloroform and insoluble in benzene, methanol and water. On the basis of nitrogen analysis, between 60 and 80% of the carbonyl groups in the original polymer were converted to oxime groups. The alpha-ketooxime obtained formed insoluble chelate compounds with cupric, ferric and chromic ions but not with mercuric, stannous or lead ions.

Example II

Fifty parts of the alpha-ketooxime obtained in Example I were dissolved in 750 parts of dioxane and warmed with stirring to solution. To the stirred solution was added a solution of hydroxylamine made by neutralizing 24.6 parts of hydroxylamine hydrochloride with 14.15 parts of sodium hydroxide. After stirring for 2½ hours the solution was allowed to stand for 16 hours. The reaction mixture separated into two layers. The upper layer was removed and a small amount of solid separated by filtration. The filtrate was concentrated in a vacuum and 53.2 parts of dark colored resinous solid was obtained. This resin was soluble in ethanol and dioxane, mostly soluble in methanol and was insoluble in chloroform or benzene. On the basis of nitrogen analysis, at least 50% of the functional groups were alpha-dioxime groups. This polymeric alpha-dioxime formed insoluble chelate compounds with cupric, mercuric, nickelous and cobaltous ions but not with chromic, uranyl or plumbous ions.

Example III

One hundred twelve parts of the ethylene/carbon monoxide copolymer used in Example I were dissolved in 320 parts of benzene and 170 parts of absolute alcohol and 5 parts of concentrated hydrochloric acid added with stirring. The stirring was continued and 140 parts of isoamyl nitrite added over a period of 1½ hours at a temperature of 35° C. After standing for 3 days 700 parts of dioxane were added and the reaction mixture adjusted to a pH of 7 with 10% sodium hydroxide solution. A hydroxylamine solution made by neutralizing 68 parts of hydroxylamine hydrochloride with 39 parts of sodium hydroxide was added to the above solution. After stirring for 2½ hours and allowing to stand for 16 hours the two layers which formed were separated. The upper layer was washed with 950 parts of water and filtered. Concentration of the filtrate yielded 146 parts (96% yield) of poly-alpha-dioxime. This resin was similar in properties and chelating ability to the resin made in Example II.

It is to be understood that the examples have illustrated certain preferred embodiments and that they are not to be construed as limitations of the invention.

The polymeric polyketones used in the practice of this invention are the products disclosed and claimed in U. S. Patent 2,495,286, i. e., aliphatic monoolefin hydrocarbon/carbon monoxide copolymers. The preferred polyketones are ethylene/carbon monoxide copolymers in which the mole ratio of ethylene to carbon monoxide is from 1:1 to 150:1.

The nitrosation reaction which leads to the formation of ketooximes having keto and oxime groups on vicinal carbon atoms is conducted at temperatures in the range of 30° to 55° C. Usually, however, good reaction rates with good yields of desired ketooxime are realized at temperatures of from 35° to 45° C. and this range therefore embraces the commonly used operating temperature conditions. In effecting the nitrosation reaction all of the nitrosating agent can be added to a solution of the polymeric polyketone in an organic solvent, or a mixture of organic solvents, or it can be added portionwise.

Because the nitrosation reaction is exothermic once it is initiated, it is necessary to regulate it either by cooling or by adding the nitrosating agent at such rate that the amount of heat of reaction evolved is just enough to maintain the temperature within the previously indicated range. The nitrosation reaction results in the introduction of oxime groups on carbons which are vicinal to the carbons carrying oxo groups.

The amount of nitrosating agent used may be varied over wide limits and depends upon the degree of nitrosation which it is desired to effect. The amount of nitrosating agent is at least 0.5 mole per oxo group in the polymeric polyketone to effect substantial modification. The upper limit of nitrosating agent is not critical and depends only upon the degree of nitrosation which it is desired to effect. For more complete nitrosation, 1.5 to 2.0 moles are used per oxo group in the polymer. At least 20% of the ketone groups should be nitrosated in the alpha-position to obtain a substantially modified polymer.

The use of a catalyst in the nitrosation is desirable in order to obtain practical rates of reaction and good yields of desired products. Hydrogen chloride is the preferred catalyst but in its place there may be used other acids, such as, sulfuric, phosphoric, etc. The amount of acid employed can be varied widely. It is preferred, however, to employ as low an amount as possible and usually the amount will range between 0.1 and 5% by weight of the polyketone.

Although isoamyl nitrite has been used in the examples, this is only because of its ready availability and ease of handling. In its place there can be used any other alkyl ester of nitrous acid which readily yields nitrous acid under the conditions of reaction. Suitable esters are ethyl nitrite, butyl nitrite, octyl nitrite, and the like. Of course, free nitrous acid from sodium nitrite and an acid can also be used, if desired.

The nitrosation reaction is generally carried out in the presence of inert materials which are solvents for the polymeric polyketone. Suitable solvents are mixtures of alcohols with aromatic hydrocarbons such as ethanol-benzene, ethanol-toluene, and the like mixtures. The amount of solvent used is such as to give as high a concentration of polymeric polyketone as possible. Usually, the amount of solvent will be such as to give solutions containing from 10 to 40% by weight of the polymeric polyketone.

The oximation of the ketooxime is conducted with hydroxylamine and the amount used is that which corresponds to at least one mole per oxo group in the polymer. If complete oximation is desired, a 25–50% excess of hydroxylamine is employed. Larger amounts can be used but generally this does not result in any practical advantages but increases costs and purification problems. At least 20% of the functional groups should be 1,2-dioxime groups.

In effecting the oximation reaction it is preferred that the hydroxylamine be cooled to between 0° and 10° C. and added to the ketooxime in solution at ambient temperatures with continuous agitation. The mixture of ketooxime and hydroxylamine is permitted to stand for at least 10 and preferably 12 hours in order to insure complete reaction.

The oximes produced in accord with this invention are unique in having the oxime groups on vicinal carbons. By virtue of this unique structural configuration, polymeric polyamines having amino groups on vicinal carbon atoms are made accessible through reduction. The polymeric poly(1,2-ketooximes) and the polymeric poly(1,2-dioximes) contain strong chelating groups which form chelates with many metals. These resins have been found useful as modifiers for coating compositions to prevent the harmful effects of small amounts of metals. They also prevent the deterioration of hydrogen peroxide solutions. Metallic derivatives of these resins may be employed as fungicides.

As many apparently widely different embodiments of this invention may be made without departing from the spirit and scope thereof, it is to be understood that this invention is not limited to the specific embodiments thereof except as defined in the appended claims.

I claim:

1. In a process for preparing polymeric oximes of polymeric poly(1,2-diketones), the step which comprises treating with nitrous acid at a temperature of 30° to 55° C. an ethylene/carbon monoxide copolymer thereby forming a polymeric poly(1,2-ketooxime).

2. In a process for preparing polymeric alpha-dioximes of a polymeric poly(1,2-diketone), the steps which comprise treating with nitrous acid at a temperature of 30° to 55° C. an ethylene/carbon monoxide copolymer and then reacting the nitrosated product with hydroxylamine at a temperature of 0° to 10° C. thereby forming a polymeric poly(1,2-dioxime).

3. A process as set forth in claim 1 in which the nitrous acid is formed in situ by reacting hydrochloric acid with a nitrite.

4. A process as set forth in claim 3 in which the polymeric poly(1,2-ketooxime) is converted to a polymeric poly(1,2-dioxime) by reaction with hydroxylamine.

5. A polymeric oxime which is the product obtained by nitrosating an aliphatic monoolefin/carbon monoxide copolymer and is characterized by having as a recurring structural unit

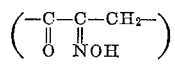

6. A polymeric oxime which is the product obtained by reacting a nitrosated aliphatic monoolefin/carbon monoxide copolymer with hydroxylamine and is characterized by having as a recurring structural unit

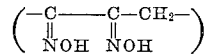

7. A polymeric oxime which is the product obtained by nitrosating an ethylene/carbon monoxide copolymer and is characterized by having as a recurring structural unit

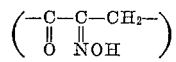

8. A polymeric oxime which is the product obtained by reacting a nitrosated ethylene/carbon monoxide copolymer with hydroxylamine and is characterized by having as a recurring structural unit

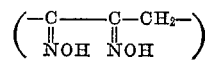

CARL M. LANGKAMMERER.

REFERENCES CITED

The following references are of record in the file of this patent:

UNITED STATES PATENTS

| Number | Name | Date |
| --- | --- | --- |
| 2,495,286 | Brubaker | Jan. 24, 1950 |

OTHER REFERENCES

Whitmore, Organic Chemistry, Von Nostrand, 1937, pages 428 and 429.